Feb. 7, 1961 T. J. ELLIS 2,970,412
PROFILE PROJECTOR OR COMPARATOR FOR CUTTING MACHINE TOOLS
Filed Feb. 6, 1959 2 Sheets-Sheet 1

INVENTOR
Thomas J. Ellis

BY *Cecil L. Wood*

ATTORNEY

INVENTOR
Thomas J. Ellis

United States Patent Office 2,970,412
Patented Feb. 7, 1961

2,970,412

PROFILE PROJECTOR OR COMPARATOR FOR CUTTING MACHINE TOOLS

Thomas J. Ellis, 9777 Formosa Circle, Dallas, Tex., assignor of fifty percent to Homer F. Diven, Pasadena, Tex.

Filed Feb. 6, 1959, Ser. No. 791,729

1 Claim. (Cl. 51—165)

This invention relates to optical devices for projection and reflecting, to be used in combination with cutting machine tools.

Cutting machine tools provided with a projection device have been known previously. The object of such devices is to observe the progress in the machining of a work piece, whereby usually the contour of the enlarged profile is compared with a drawing enlarged on a corresponding scale, on the viewing screen. Such machine tools provided with projection devices are frequently constructed in such a manner that diascopic as well as episcopic projection can be used.

The invention is particularly applicable to universal grinders having a work holding fixture consisting of a universal vise, and in which a cutting tool consisting of a grinding disc is positioned above the work and is adjustable vertically relative thereto.

The invention is also applicable to precision machine tools other than grinders.

An object of the invention is to provide a projection device which is adapted to expedite and make more convenient the cutting of form tools on universal grinders. The device of the invention enables the operator of such a grinder to grind a tool to form without removing the tool from the tool holder to check its dimensions.

Another object of the invention is to provide a small, compact projection device which is adapted to be mounted directly on the universal vise comprising the work holding fixture of a universal grinder, whereby the work is automatically focused relative to the device, and an image of the work is projected on the viewing screen of the device immediately upon placing the work in the vise.

An advantageous feature of the invention is that the work remains in focus upon changing the position of the work relative to the cutting tool. The work remains in its original position relative to the projection device as the cutting operation proceeds, and the operator is able to visually examine the work contour continuously as the forming operation is continued to completion.

Another advantageous feature of the invention is that it is adapted for diascopic as well as episcopic projection of an image of the work piece on the viewing screen of the device, and such image as projected is fully resolved, being neither inverted nor reversed.

Another advantageous feature of the invention is that the light for both diascopic and episcopic illumination of the work piece is provided by a single low voltage, high intensity bulb.

Another advantageous feature of the invention is that the entire device is adapted to be mounted on one of the relatively movable portions of a work holding vise, and with the exception of a reflecting mirror, is adapted to be positioned entirely on one side of the work. The reflecting mirror, which is positioned on the opposite side of the work, and provides diascopic illumination thereof, is connected to the remainder of the device by a pair of elongated supporting elements which straddle the work. This arrangement provides an open structure which permits a cutting tool, such as a grinding disc, positioned above the work to be readily maneuvered relative thereto, and does not interfere with the normal operation of the tool.

The invention will be readily understood by referring to the following description and the accompanying drawing, in which.

Figure 1:
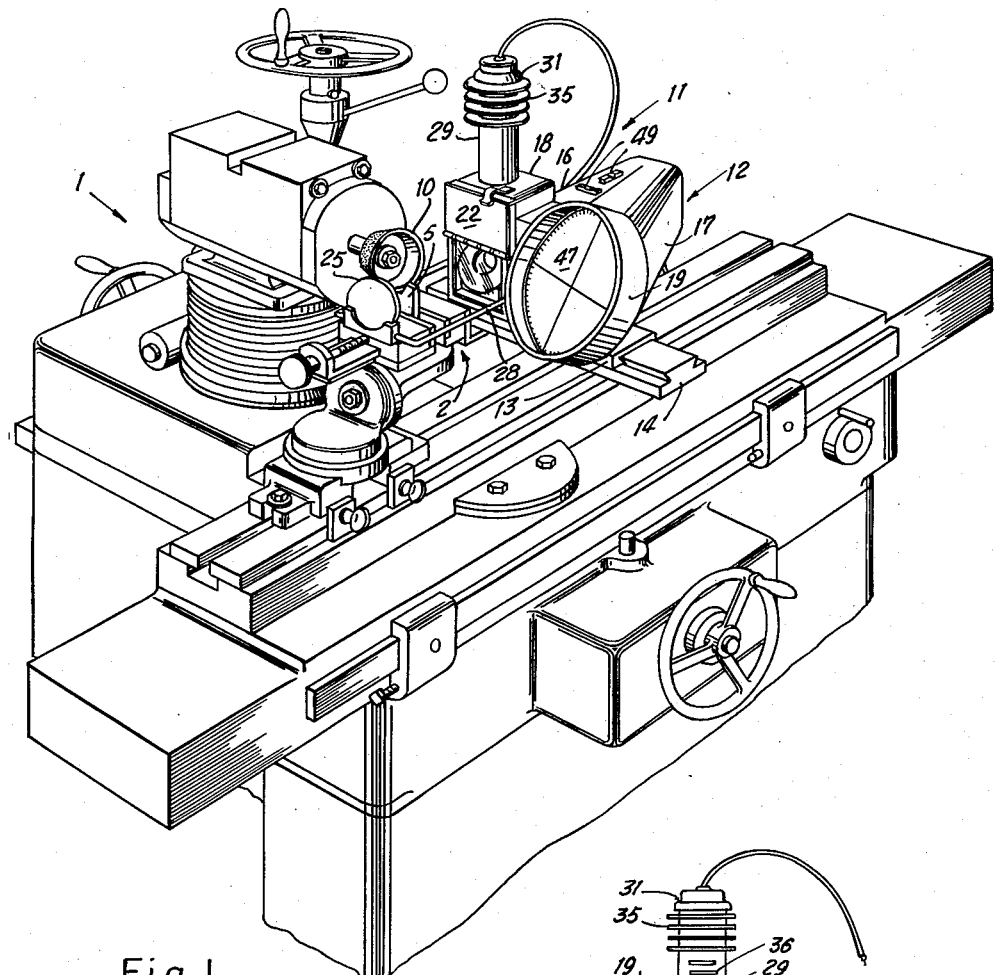
Fig. 1 is a perspective view of a universal grinder having a projection device embodying the invention applied thereto.
Figure 2:
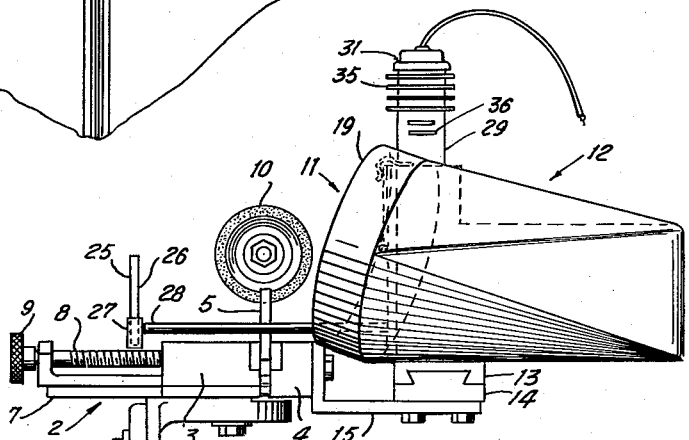
Fig. 2 is a side elevational view of the projection device, showing the grinder fragmentarily.
Figure 3:
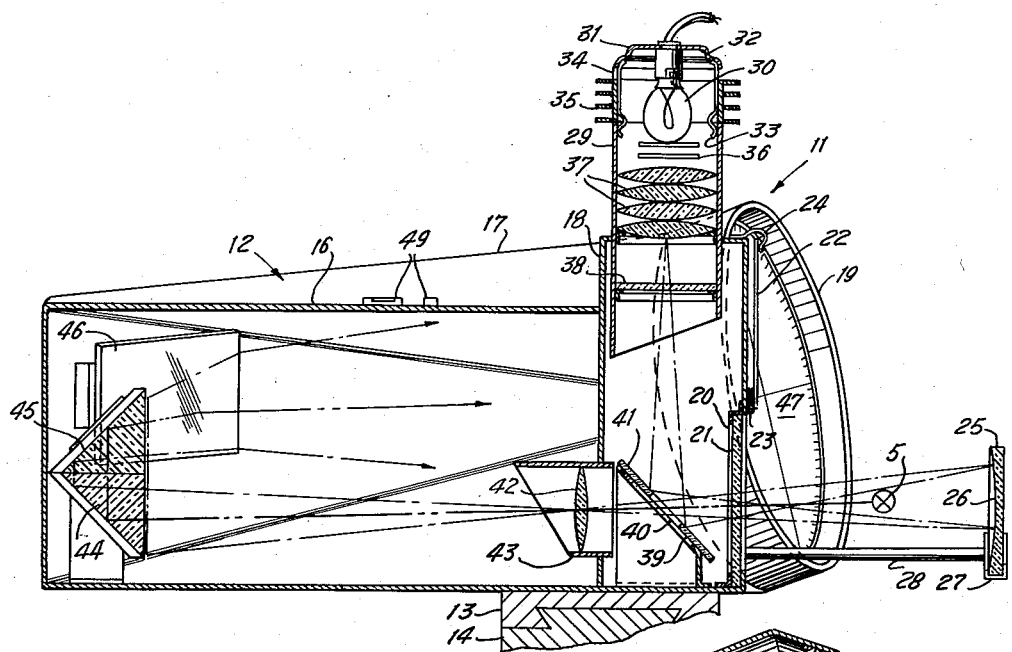
Fig. 3 is a sectional elevational view of the projection device.
Figure 4:
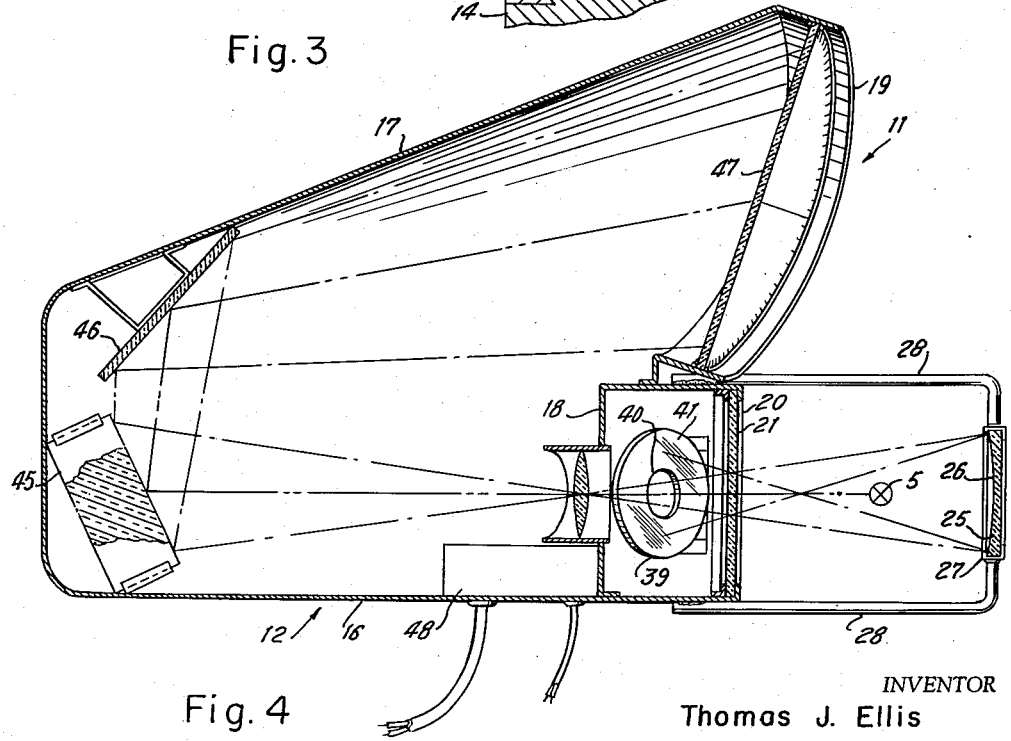
Fig. 4 is a sectional plan view thereof.

Referring to the drawing, the numeral 1 designates generally a universal grinder. The grinder 1 has a work holding fixture consisting of a universal vise 2. The vise 2 has a pair of relatively movable members or jaws, numbered 3 and 4, respectively, which are adapted to clamp a work piece, indicated by the numeral 5, between them.

The member 3 is mounted on a universal support therefor, which is designated generally by the numeral 6. The member 4 is mounted on a dovetailed slide 7 for movement relative to the member 3, and is adjustable relative thereto by means of a threaded rod 8 having a knurled knob 9 thereon.

The grinder 1 has a cutting tool consisting of a grinding disc 10, which is positioned above the work piece 5 and is adjustable vertically relative thereto.

A projection device embodying the invention, which is designated generally by the numeral 11, has a housing 12 which is mounted on a dovetailed slide 13 for longitudinal adjustment relative to a corresponding slide 14 carried by an arm 15, which is removably connected to the member 4. The slide 13 is positioned at right angles to the slide 7.

The housing 12 is irregularly shaped, and has forwardly diverging side portions 16 and 17. The side portion 16 is generally rectangular, and is adapted to be aligned longitudinally with the work piece 5. A substantially rectangular compartment 18 is formed in the housing 12 forwardly of the side portion 16, and extends upwardly above it. The side portion 17, which is merged with the side portion 16 rearwardly of the compartment 18, is tapered forwardly and outwardly relative to the side portion 16 and terminates at its front end in a circular end portion 19 which is inclined upwardly and inwardly toward the side portion 16.

A substantially rectangular window 20, which has a glass plate 21 therein, is provided in the front end of the side portion 16, adjacent the bottom of the compartment 18. The window 20 normally faces the work piece 5. A cover plate 22, which is adapted to close the window 20, is pivotally connected to the front end of the side portion 16 at 23, and is normally retained in open position by a spring clip 24.

A circular mirror 25, which has a concave mirrored surface 26, is positioned in spaced apart relation to the housing 12, opposite the window 20, whereby it is adapted to be placed behind the work piece 5, on the opposite side thereof from the window 20. The mirror 25 is received in a socket 27, which is connected at its ends to a pair of elongated, tubular supporting elements 28. The elements 28 are adapted to straddle the work piece 5, and are connected at one end to the side portion 16 of the housing 12.

A vertically disposed cylindrical element 29 is arranged centrally of the compartment 18, adjacent the top thereof, and extends upwardly above it. A low voltage, high intensity lamp 30, which is attached to a closure element 31 having a reflecting surface 32, is received in the upper end of the cylindrical element 29.

The closure element 31 is removably connected to the cylindrical element 29 by a plurality of spring clips 33, and preferably is spaced apart from the upper end thereof to provide an annular space 34 between them for the dissipation of heat. The cylindrical element 29 also has radially outwardly extending fins 35 and arcuate slots 36 adjacent its upper end for the dissipation of heat.

A plurality of lenses 37 having convex surfaces on opposite sides thereof are arranged one above the other within the cylindrical element 29, below the lamp 30, whereby the light from the lamp 30 is intensified. A green filter 38 is positioned in the cylindrical element 29 below the lenses 37.

A circular mirror 39, which has a round hole 40 in its center and has a reflecting surface 41, is disposed within the compartment 18, near the bottom thereof, in the path of light from the lamp 30. The mirror 39 is inclined at an angle of 45 degrees relative to the vertical and horizontal planes, and faces upwardly and forwardly, in opposed relation to the lamp 30 and the window 20.

Light from the lamp 30 is directed horizontally and forwardly, by the mirror 39, against the concave mirrored surface 26 of the reflecting mirror 25, which is normally positioned behind the work piece 5 and facing it, to provide diascopic illumination of the work piece 5, while at the same time such light is directed against the side of the work piece 5 opposite the mirror 25 to provide episcopic illumination of the work piece 5.

Light reflected by the mirror 25 and the work piece 5 is directed back through the hole 40 in the center of the mirror 39, and thence through a focusing lens 42. The lens 42 has convex surfaces on opposite sides thereof, and is adjustably positioned in a sleeve 43, which extends through the rear wall of the compartment 18, opposite the window 20.

A pair of prisms 44 and 45, which are in the form of right triangles having two equal sides, as viewed in transverse section, are positioned rearwardly of the side portion 16 of the housing 12. The prisms 44 and 45 are arranged horizontally, one upon the other, with their right angles adjoining.

The hypotenuses of the prisms 44 and 45 which are positioned rearwardly thereof, are arranged at right angles to each other, and are inclined at an angle of 45 degrees relative to the vertical and horizontal planes.

Two equal sides of the respective prisms 44 and 45, which are identical, face each other. Two other equal sides thereof are disposed vertically, in alignment with each other, at an angle of 45 degrees relative to the longitudinal axis of the side portion 16, facing forwardly and laterally in the direction of the opposite side portion 17.

The lower prism 44 is arranged in the path of light directed through the focusing lens 42, as above described. The arrangement is such that such light is directed upwardly by the action of the lower prism 44, and forwardly and laterally, in the direction of the opposite side portion 17, by the action of the upper prism 45.

A planar reflecting mirror 46 is positioned rearwardly of the side portion 17, in the path of light reflected by the upper prism 45. The mirror 46 is disposed vertically, and is inclined at an obtuse angle relative to the vertical sides of the prisms 44 and 45, facing forwardly and laterally in the direction of the opposite side portion 16.

Light reflected by the mirror 46 is projected on a viewing screen 47, which is disposed in the circular end portion 19, forwardly of the side portion 17. The viewing screen 47 advantageously may be formed of frosted glass, and preferably is green.

The arrangement is such that the image of the work piece 5, which is inverted as well as reversed by the action of the focusing lens 42, is again inverted and reversed by the action of the prisms 44 and 45 and the mirror 46, so that it is fully resolved as it is projected on the viewing screen 47.

A pair of mirrors arranged at right angles to each other may be substituted for the prisms 44 and 45 if desired.

An enlarged scale drawing, drawn on an opaque sheet of paper, may be placed over the viewing screen 47 for comparison with the image of the work piece 5 as projected thereon. Alternatively, the viewing screen 47 may be calibrated as desired.

A transformer 48 is provided as a source of low voltage electricity for the lamp 30.

A pair of level gauges 49 are attached to the top of the housing 12.

The invention may be modified in various ways without departing from the spirit and scope thereof.

What is claimed is:

In combination with a cutting machine tool having an adjustable work holding fixture and a cutting tool adapted to be positioned above the work and adjustable vertically relative thereto, a projection device including a housing having means removably and adjustably connecting it to the work holding fixture and adapted to be secured in predetermined fixed position rearwardly of the work, a window in the housing in opposed relation to the work, a viewing screen in the housing in laterally spaced relation to the window, a concave mirror having means supporting it in spaced apart relation to the housing, forwardly of the window, whereby it is adapted to be placed on the opposite side of the work from the housing, facing the work, comprising a socket having the mirror received therein and a pair of elongated supporting elements connected at their ends to the housing and the socket, the supporting elements being spaced apart from each other and being adapted to straddle the work, means in the housing for projecting a beam of light forwardly, through the window, against the work and the concave mirror behind it simultaneously, whereby the work is illuminated episcopically as well as diascopically, comprising a light source in the top of the housing and a circular mirror below the light source, rearwardly of the window, the mirror having a round opening in its center and being inclined at an angle of 45 degrees relative to the vertical and horizontal planes, facing upwardly and forwardly, a focusing lens in the housing, in the path of light reflected by the work and the concave mirror, and reflecting means in the housing, in the path of such reflected light, rearwardly of the lens, adapted by a succession of steps to fold the light upwardly, and then laterally, and finally, forwardly, whereby an enlarged image of the work is projected on the viewing screen, and the image as projected on the viewing screen is fully resolved by the action of the reflecting means, comprising a pair of identical prisms having the shape of right triangles having two equal sides, as viewed in transverse section, arranged horizontally, one upon the other, with their right angles adjoining, the hypotenuses of the prisms being positioned rearwardly thereof and being arranged at right angles to each other and inclined at an angle of 45 degrees relative to the vertical and horizontal planes, two equal sides of the respective prisms facing each other and two other equal sides thereof being disposed vertically, in alignment with each other, at an angle of 45 degrees relative to the path of such reflected light, the lower prism being arranged in said path and the arrangement being such that the light is folded upwardly by the action of the lower prism, and forwardly and laterally by the action of the upper prism, and a planar mirror in the path of light reflected by the upper prism, the last mentioned mirror being disposed vertically, and being inclined at an obtuse angle relative to the vertical sides of the prisms, whereby light reflected by the last mentioned mirror is projected on the viewing screen.

References Cited in the file of this patent

UNITED STATES PATENTS

| | | |
|---|---|---|
| 2,404,770 | Bennett et al. | July 30, 1946 |
| 2,481,381 | Banko | Sept. 6, 1949 |

FOREIGN PATENTS

| | | |
|---|---|---|
| 715,619 | Great Britain | Sept. 15, 1954 |